L. P. PEASE.
Churn.
No. 13,686.  Patented Oct. 16, 1855.
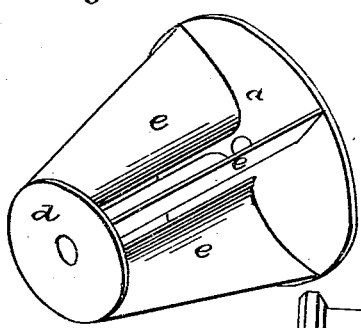
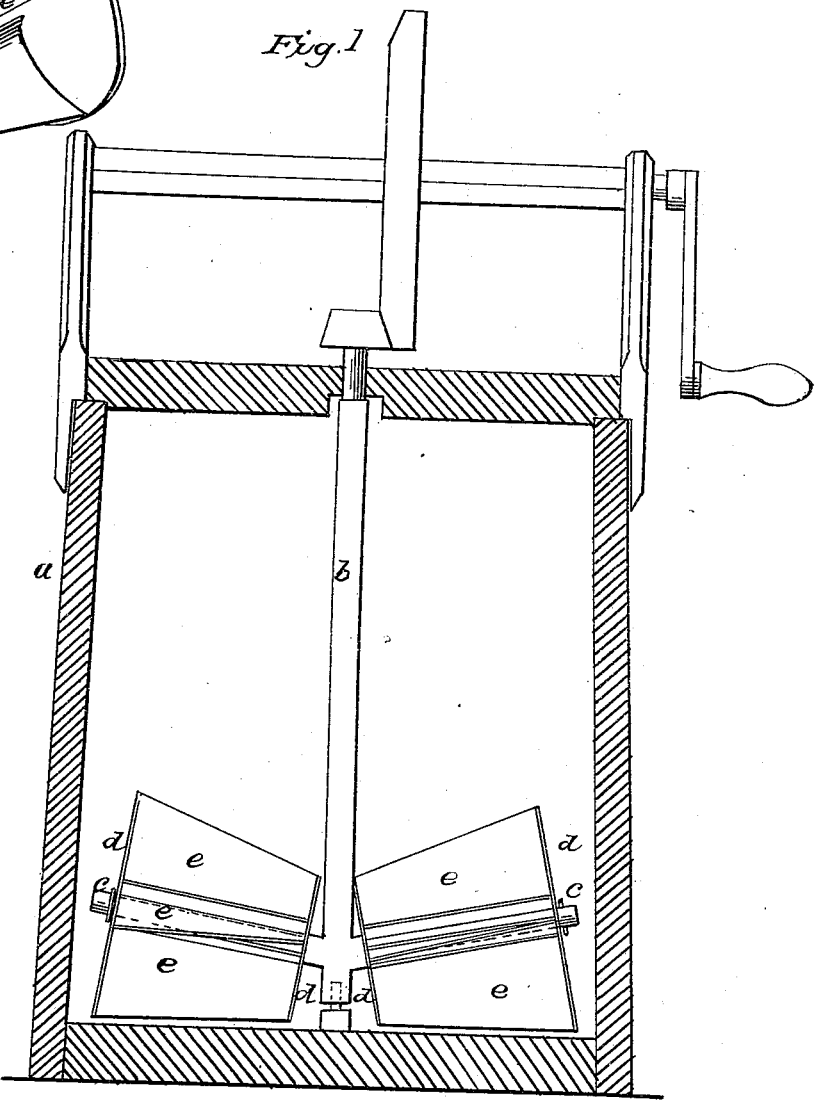

UNITED STATES PATENT OFFICE.

LEWIS P. PEASE, OF MOUNT CARMEL, ILLINOIS.

CHURN.

Specification of Letters Patent No. 13,686, dated October 16, 1855.

*To all whom it may concern:*

Be it known that I, LEWIS P. PEASE, of Mount Carmel, Wabash county, Illinois, have invented a new and useful Improvement in Churns; and I do hereby declare the following to be a full, clear, and exact description thereof, reference being had to the annexed drawings, making part of this specification.

The object of my invention is to accelerate the churning process by means of the agitation arising from conflicting currents.

In the accompanying drawings Figure 1 is an axial section. Fig. 2 is a perspective view of one of the rotating wings of the dasher.

The tub ($a$) is of the square form.

($b$) is a shaft, pivoted in a vertical position at the center of the churn. From opposite sides of this shaft near its lower extremity branches a pair of round rods ($c$) forming the axles of two revolving wings ($d\ e$) each composed of a pair of circular heads ($d$) of unequal diameter joined by a number of beaters or paddles ($e$) stretching from the outer to the inner head, have their edges flush or nearly so with the margins of the heads, so as, by their rotation about the axles ($c$), to present a conical outline, and they are also so curved and attached as represented, as to present similar concave or convex surfaces in the same direction of rotation about the said axles ($c$), the axles projecting in such position outward and slightly upward as to present the lower sweep of the paddles parallel with the tub bottom. These curved surfaces are so formed and arranged as to gather the cream and by the reaction of the liquid contents against their surfaces, are forced to revolve around their axles ($c$) in addition to their primary rotation in a horizontal plane around the center shaft ($b$). This rotation of each wing around its respective axle, results in a constant breaking up of the principal vortex by the counter currents thus generated by the wings, and hence there results a more violent agitation of the cream, and consequently a more speedy formation of butter.

I claim as new and of my invention—

The winged dasher formed by two series of curved paddles as described, rotating around axles projecting outward and slightly upward from a vertical shaft; the said paddles of each series forming a conic frustum revolving with its lower edge parallel to the tub bottom.

In testimony whereof, I hereunto set my hand before two subscribing witnesses.

LEWIS P. PEASE.

Witnesses:
 GEO. H. KNIGHT,
 T. CRANE.